(12) United States Patent
Krijzer et al.

(10) Patent No.: US 6,414,446 B2
(45) Date of Patent: Jul. 2, 2002

(54) SWITCHING DEVICE

(75) Inventors: Markus Krijzer; Oscar Jan Deurloo, both of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/808,278

(22) Filed: Mar. 14, 2001

(30) Foreign Application Priority Data

Mar. 16, 2000 (EP) .............................................. 00200961
Dec. 4, 2000 (EP) .............................................. 00204304

(51) Int. Cl.[7] .............................................. H05B 37/00
(52) U.S. Cl. ....................... 315/245; 315/289; 315/290; 315/DIG. 5; 315/DIG. 7
(58) Field of Search ................................ 315/289, 290, 315/244, 245, 246, 291, 219, 307, 276, 282, DIG. 2, DIG. 5, DIG. 7, 209 R

(56) References Cited

U.S. PATENT DOCUMENTS

| | | | | |
|---|---|---|---|---|
| 4,678,968 A | * | 7/1987 | Lester ......................... | 315/221 |
| 4,958,107 A | * | 9/1990 | Mattas et al. ................ | 315/244 |
| 5,428,268 A | | 6/1995 | Melis et al. ................. | 315/247 |
| 5,726,537 A | * | 3/1998 | Huber et al. ............ | 315/209 R |

* cited by examiner

*Primary Examiner*—Haissa Philogene

(57) ABSTRACT

A switching device intended for igniting and operating a high-pressure discharge lamp, provided with a switch-mode power supply (smps) for supplying a controlled current to the lamp, and with a pre-conditioner for feeding the smps. The pre-conditioner is provided with a storage capacitor. The switching device also includes an ignition circuit including a pulse capacitor and a switch for generating ignition-voltage pulses for igniting the lamp. The pulse capacitor, having a capacity of CF, is energized from the storage capacitor via an ohmic resistor.

4 Claims, 2 Drawing Sheets

SWITCHING DEVICE

BACKGROUND OF THE INVENTION

The invention relates to a switching device for igniting and operating a high-pressure discharge lamp, provided with a switch-mode power supply (smps) for supplying a controlled current to the lamp, and with a pre-conditioner having a buffer capacitor for feeding the smps, which switching device also comprises an ignition circuit intended to generate ignition voltage pulses for igniting the lamp, a pulse capacitor of which, having a capacitance of CF, is connected to the buffer capacitor by means of an ohmic resistor having a value of R ohm.

A switching device of the type mentioned in the opening paragraph is known from U.S. Pat. No. 5,428,268. An ignition pulse is generated by short-circuiting the pulse capacitor of the ignition circuit. A drawback of the known switching device is, however, that repetition of the ignition pulse generation is possible only at a very low repetition frequency of 2 Hz. Such a low repetition frequency renders the known switching device unsuitable for igniting and operating particularly metal-halide lamps taking power from any type of public supply system in use anywhere in the world. To reliably ignite such lamps, the requirement to be met, in practice, by the ignition circuit is that the ignition pulses generated per second must have an overall pulse width of at least 100 μs, measured at a voltage level of at least 2700 V. It has been found, however, that the known switching device is incapable of meeting this practical requirement. A further drawback resides in that the construction of the known switching device leads to comparatively large dimensions.

SUMMARY OF THE INVENTION

It is an object of the invention to obviate these drawbacks. Surprisingly, this object is achieved in that the switching device of the type mentioned in the opening paragraph is characterized, as a switching device in accordance with the invention, in that the product of R and C is at most $10^{-2}$. This means that pulses can be generated at a repetition frequency of at least 100 Hz. The inventors have found that, at such a repetition frequency, the desired, overall pulse width can be achieved in practice.

Preferably, a frequency above 100 Hz is achieved. In general, a frequency in a range up to 30 kHz is favorable. A comparatively high repetition frequency enables comparatively small components to be used in the ignition circuit, which is conducive to a substantial degree of miniaturization of the ignition circuit and hence of the switching device.

A suitable repetition frequency can be more readily achieved if use is made of a suitably-sized buffer capacitor. For example, it has been found that the buffer capacitor has a sufficiently large buffer if the size of the buffer capacitor is at least 1 μF, preferably at least 4.7 μF.

In an advantageous embodiment of the switching device in accordance with the invention, the ignition circuit comprises a switch for closing an electric resonant circuit used to generate ignition voltage pulses, said switch being formed by an IGBT (Insulated Gate Bipolar Transistor). This has the advantage that closing of the switch takes place rapidly, which has a favorable effect on the formation of a high voltage pulse. A further advantage resides in that the IGBT is voltage-controlled, and that the forward voltage is independent of the forward current.

BRIEF DESCRIPTION OF THE DRAWINGS

These and other aspects of the invention will be apparent from and elucidated with reference to the embodiment(s) described hereinafter.

In the drawing.

DESCRIPTION OF THE PREFERRED EMBODIMENT

Figure 1:
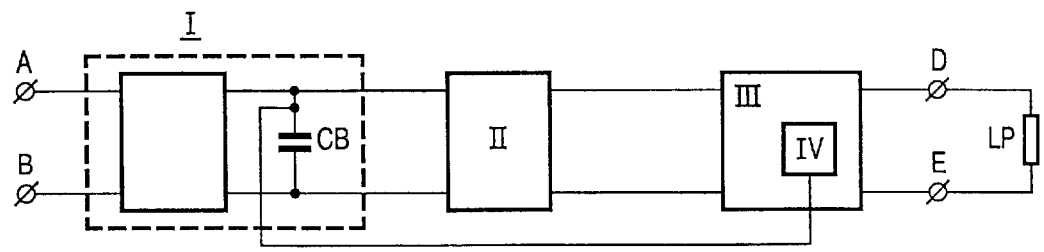
FIG. 1 shows a switching device in accordance with the invention.

FIG. 1 shows a switching device in accordance with the invention, which switching device is provided with input terminals A, B which are to be connected to a power supply source. I denotes a pre-conditioner with a buffer capacitor CB, which serves to feed a switch-mode power supply (smps) II. Said smps serves to supply a controlled current to a lamp LP, and is connected to a commutator III accommodating an ignition circuit IV intended to generate ignition voltage pulses for igniting the lamp LP. The commutator is provided with output terminals D, E which are to be connected to the lamp LP to be ignited and operated.

Figure 2:
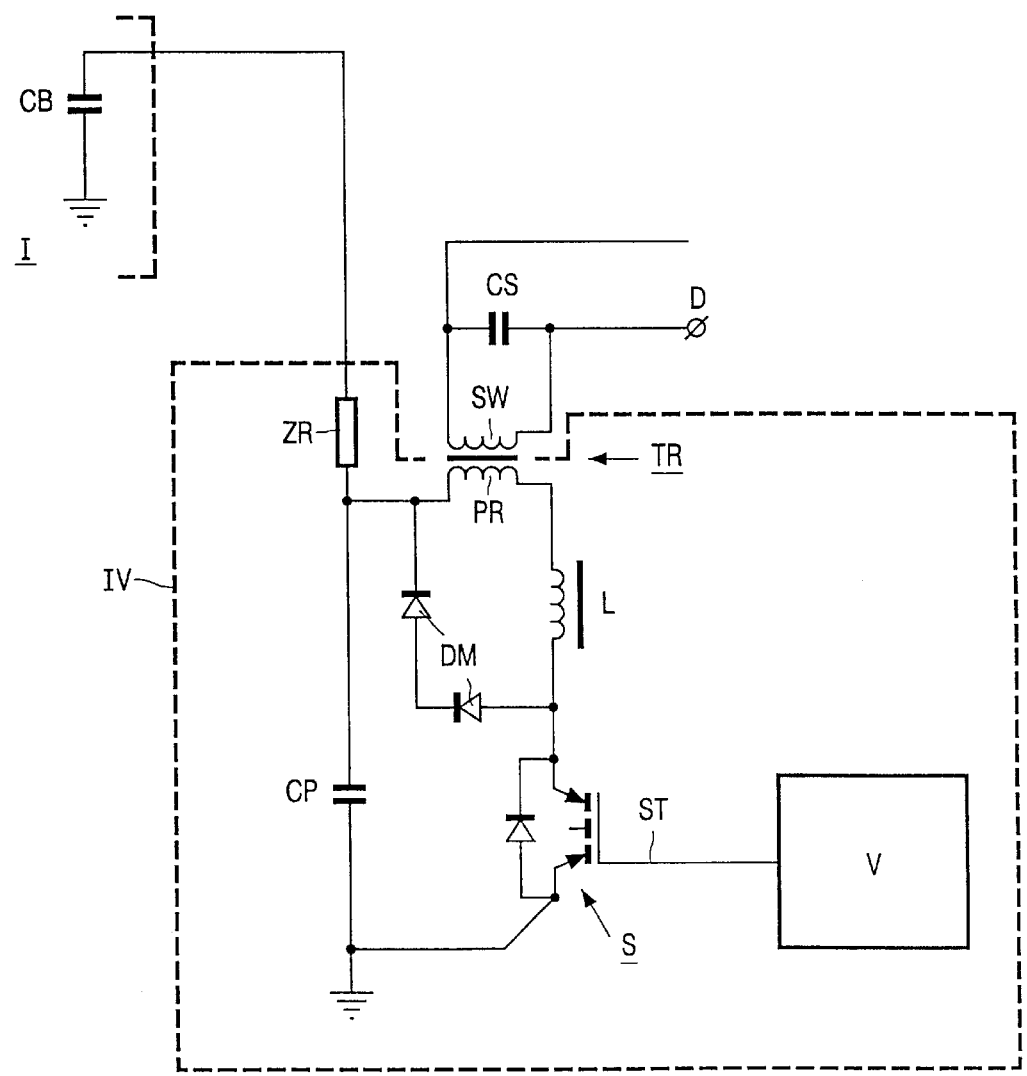
FIG. 2 diagramatically shows a part of the switching device shown in FIG. 1.

FIG. 2 is a detailed view of a part of the switching device, in particular the ignition circuit IV and the connection of said ignition circuit to the buffer capacitor CB of the pre-conditioner I.

The ignition circuit is provided with a pulse capacitor CP having a capacitance of CF, which is connected to the buffer capacitor CB by means of an ohmic resistor ZR having a value of R Ohm. The pulse capacitor CP forms part of an electric resonant circuit for generating ignition voltage pulses, comprising, in addition to a self-inductance L, a switch S for closing the electric resonant circuit. A primary winding PR of a transformer TR also forms part of the resonant circuit. A secondary winding SW of the transformer, which forms part of the commutator III, is connected to one of the output terminals D, E. A capacitor CS may be provided parallel to the secondary winding in order to favorably influence the shape of the ignition pulse.

Preferably, the switch is an IGBT. A control electrode ST of the IGBT is connected to a control circuit V. In the example described herein, the control circuit is self-oscillating. Advantageously, the self-oscillating control circuit has an oscillation frequency which also forms the repetition frequency. Preferably, it applies that the repetition frequency at which control pulses are generated does not exceed ⅓*(1/RC). It is thus ensured that the pulse capacitor CP is charged substantially completely before the electric resonant circuit is closed by means of the switch.

The operation of the ignition circuit is as follows. The pulse capacitor CP is charged, via the ohmic resistor ZR, from the buffer capacitor CB. At this stage, the switch S is in the open, non-conducting state. Subsequently, the self-oscillating control circuit V will drive the switch S into conduction, at some point of time, via the control electrode, thereby closing the resonant circuit. The pulse capacitor subsequently discharges via the transformer TR and the self-inductance L. The resultant current peak in the primary winding PR of the transformer TR generates a high voltage pulse at the secondary winding SW, which is subsequently applied across the connected lamp LP via the output terminal. The switch is subsequently switched back to the non-conducting state by means of the control circuit in a manner which is known per se, after which the above-described process is repeated until ignition of the lamp is achieved. The control circuit is provided with means, in a manner which is also known per se, which make it possible to detect the ignited state of the lamp and, as a result, preclude that the switch can become conducting.

Preferably, the primary winding PR of the transformer TR and the self-inductance L are shunted by diode means DM, thereby precluding, in a simple yet efficacious way, that current transformation in the ignition circuit causes losses during stable lamp operation.

In a practical embodiment of the switching device in accordance with the invention described herein, this switching device can suitably be used to ignite and operate a metal-halide lamp with a rated power of 150 W, manufactured by Philips. The buffer capacitor of the pre-conditioner embodied so as to be a boost or (step-) upconverter has a size of 34 $\mu$F. In the operating state, the voltage across the buffer capacitor is 480 V. The smps is embodied so as to be a (step-) downconverter, which is known per se, and which supplies a controlled current to the connected lamp via the commutator in the form of a bridge circuit. The pulse capacitor of the ignition circuit has a capacitance C of 150 nF and is connected to the buffer capacitor by means of a series-connected resistor having a value R of 4.4 k$\Omega$. As the product RC is $6.6*10^{-2}$, the requirement that this product should be at most $10^{-2}$ is met. The pulse capacitor forms part of a resonant circuit with a self-inductance of 47 $\mu$H and an IGBT of the type STGD7NB60H, manufactured by SGS Thomson, as the switch. A transformer having a winding ratio between primary winding and secondary winding of 7:90 forms part of the resonant circuit. A 0.5 nF capacitor is arranged parallel to the secondary winding. The self-inductance and the primary winding of the transformer are shunted by a series arrangement of 2 BYD37J-type diodes. The self-oscillating control circuit generates control pulses having an oscillation frequency, which is also the repetition frequency, of 170 Hz.

Figure 3:
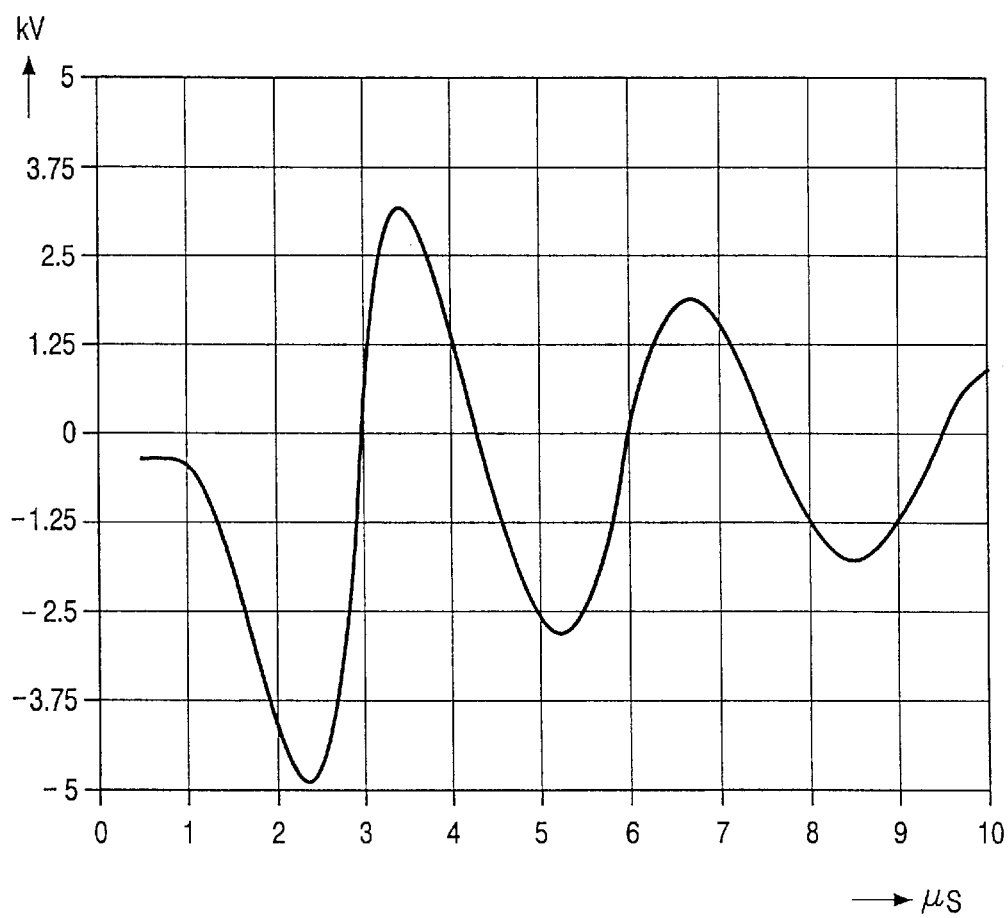
FIG. 3 shows a graph of an ignition voltage pulse.

By means of the practical embodiment of the switching device, ignition pulses of 4.92 kV are generated having a pulse width of approximately 1 is at 2700 V. For a case of negative polarity, such a generated pulse is shown in FIG. 3, the voltage in kV being plotted along the vertical axis, and the time in ULs being plotted along the horizontal axis. In the case shown in the drawing, the generated pulse has an offset of −300 V, being the voltage across the output terminals of the commutator. The repetition frequency of the ignition pulse generation is 170 Hz. By choosing the repetition frequency to be substantially below $\frac{1}{3}*(1/RC)=500$ Hz, a sufficiently large pulse width at 2700 V is advantageously combined with a substantial limitation of losses during charging the pulse capacitor.

What is claimed is:

1. A switching device for igniting and operating a high-pressure discharge lamp, said device comprising a switch-mode power supply (smps) for supplying a controlled current to the lamp, a pre-conditioner having a buffer capacitor for feeding the smps, and an ignition circuit for generating ignition voltage pulses for igniting the lamp, said ignition circuit including a pulse capacitor, having a capacitance of CF, connected to the buffer capacitor by means of an ohmic resistor having a value of R ohm, characterized in that the product of R and C is at most $10^{-2}$.

2. A switching device as claimed in claim 1, characterized in that the buffer capacitor has a capacitance of at least 1 $\mu$F.

3. A switching device as claimed in claim 2, characterized in that the buffer capacitor has a capacitance of at least 4.7 $\mu$F.

4. A switching device as claimed in claim 1, characterized in that the ignition circuit comprises a switch for closing an electric resonant circuit used to generate ignition voltage pulses, said switch being formed by an IGBT.

* * * * *